United States Patent [19]
Karita

[11] Patent Number: 5,297,449
[45] Date of Patent: Mar. 29, 1994

[54] TRANSMISSION DEVICE

[76] Inventor: Hiroshi Karita, 1343, Isobe, Sagamihara-Shi, Kanagawa-Ken, Japan

[21] Appl. No.: 900,288

[22] Filed: Jun. 18, 1992

[30] Foreign Application Priority Data

Jun. 18, 1991 [JP] Japan .................................. 3-173271

[51] Int. Cl.$^5$ .............................................. F16H 1/18
[52] U.S. Cl. .......................................... 74/128; 74/89; 74/112; 74/424.8 B
[58] Field of Search ................. 74/89, 89.15, 112, 113, 74/114, 128, 129, 424.8 B

[56] References Cited

U.S. PATENT DOCUMENTS

| | | | |
|---|---|---|---|
| 3,380,316 | 4/1968 | Wilkinson | 74/424.8 B |
| 4,593,576 | 6/1986 | Schindel | 74/424.8 B |
| 5,117,701 | 6/1992 | Thuries et al. | 74/424.8 B X |

FOREIGN PATENT DOCUMENTS

| | | | |
|---|---|---|---|
| 973394 | 8/1975 | Canada | 74/424.8 B |
| 1326402 | 4/1963 | France | 74/424.8 B |

*Primary Examiner*—Rodney H. Bonck
*Assistant Examiner*—William O. Trousdell
*Attorney, Agent, or Firm*—Joseph W. Berenato, III

[57] ABSTRACT

A transmission device having a simplified construction as well as a higher power transmission efficiency is provided, wherein a rotational speed can be changed steplessly without interrupting a power transmission and the rotation can be reversed. In the outer periphery of the rotating shaft (2) a thread-shape spline (5) having a first inclined plane oblique to the axial direction is provided and a rotating body (3) having a spline (not-shown) engaging with the spline (5) is rotatably and externally engaged with the rotating shaft (2). One of the rotating shaft (2) or the rotating body (3) is selected as a driving side and the other is selected as a driven side and both or one of the rotating shaft (2) and the rotating body (3) are displaced in the axial direction of the rotating shaft (2). By changing the relative speed and direction of displacement between the rotating shaft and the rotating body at their displacement, a rotation of constant speed can be transmitted into the driven side at a speed changed steplessly in a possible range or in a reverse direction.

11 Claims, 8 Drawing Sheets

TRANSMISSION DEVICE

BACKGROUND OF THE INVENTION

This invention relates to a transmission device which transmits power from a driving side to a driven side.

Conventionally, a transmission device for transmitting a rotation from a power at the same rotational speed, at an increased rotational speed or at a decreased rotational speed has been used mainly as a speed change device. As such a speed change device, the following examples are enumerated.

Figure 10A:
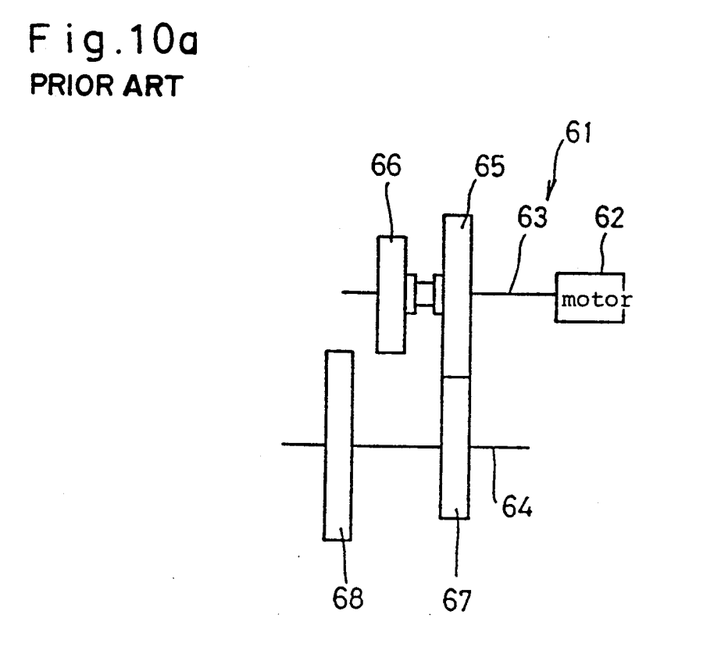
FIGS. 10(a), 10(b), 11 and 12 are schematic representations showing a prior example.
Figure 10B:
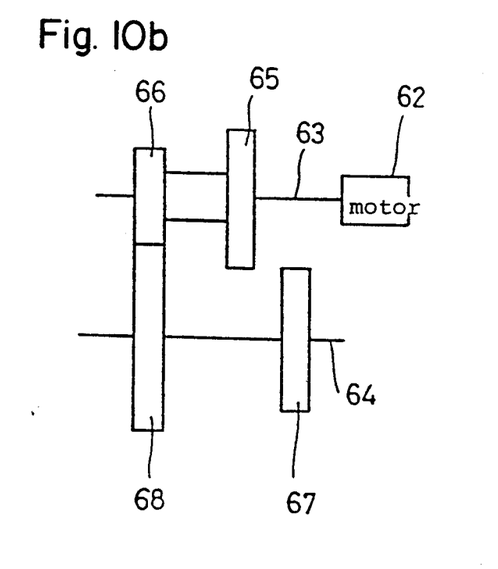

FIG. 10 (a) is a schematic representation showing a general gear type multistage speed change device, wherein the gear type multistage speed change device 61 has an input shaft 63 connected to a motor 62 as a driving side and a driven shaft 64 as a driven side. Said input shaft 63 is provided with a first speed input shaft gear 65 and a second speed input shaft gear 66 and said driven shaft 64 is provided with a first speed driven shaft gear 67 engaging with said first speed input shaft gear 65 and a second speed driven shaft gear 68. Furthermore, the gear ratio is preset such that a gear ratio of the first speed input shaft gear 65 to the first speed driven shaft gear 67 is different from a gear ratio of the second speed input shaft gear 66 to the second speed driven shaft gear 68. In addition, when the second speed input shaft gear 66 and the second speed driven shaft gear 68 come into an engagement by a displacement of said driven shaft 64 (FIG. 10 (b)), a rotational speed transmitted from the input shaft 63 to the driven shaft 64 will be changed stepwise.

Figure 11:
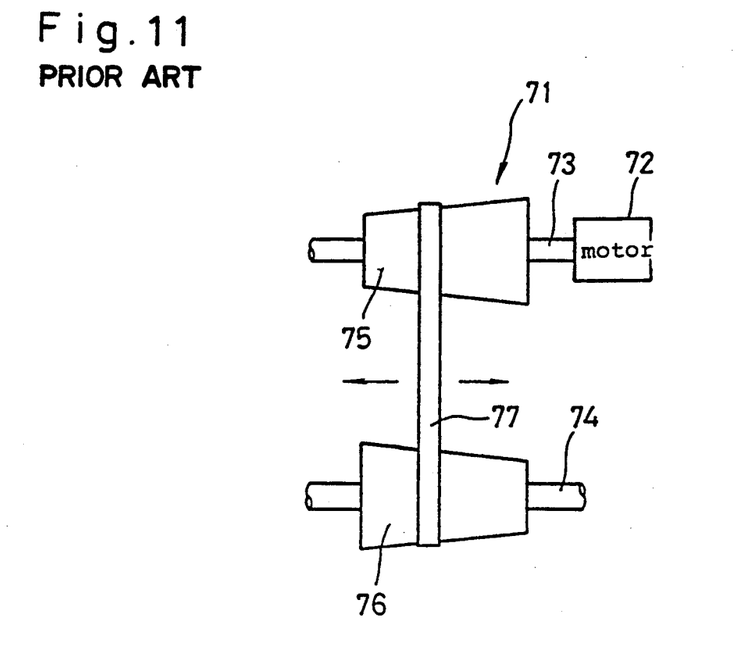

As an example of belt type, a belt type stepless speed change device 71 (as shown in FIG. 11) is used. Said belt type stepless speed change device 71 has an input shaft 73 connected to a motor 72 as a driving side and a driven shaft 74 parallel to the input shaft 73 as a driven side. Said input shaft 73 and said driven shaft 74 are provided with an approximately conical pulley 75, 76, respectively, wherein a belt 77 transmitting a power from the input shaft 73 to the driven shaft 74 is wound around both pulleys 75, 76. Therefore, the rotational speed of the driven shaft 74 can be changed steplessly when the difference of peripheral speed between both pulleys 75 and 76 is changed by a displacement of the winding location of said belt 77 in the axial direction of the inputs shaft 73 and the driven shaft 74.

Figure 12:
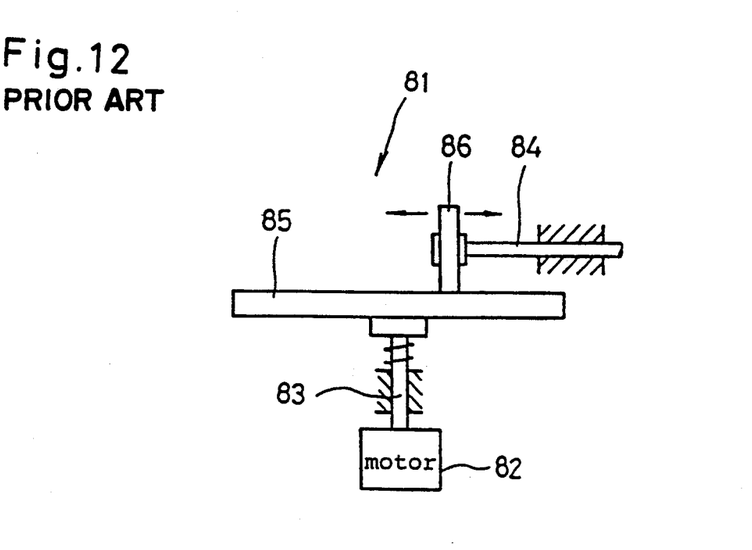

Furthermore, as an example of a stepless speed change device, a friction disc type stepless speed change device 81 (as shown in FIG. 12) is used. Said friction disc type stepless speed change device 81 is provided with an input shaft 83 connected to a motor 82 as a driving side and a driven shaft 84, perpendicular to the input shaft 83, as a driven side, wherein the input shaft 83 is provided with an input shaft disc 85 witn a larger diameter and the driven shaft 84 is provided with a driven shaft disc 86 abutted against the input shaft disc 85. In said friction disc type stepless speed change device 81, the rotational speed of said driven shaft 84 can be changed steplessly by using the difference of the peripheral speed between the input shaft disc 85 and the driven shaft disc 86 by a displacement of said driven shaft disc 86 in the radial direction of said input shaft disc 85 in the same way as said belt type stepless speed chabge device 71.

However, in such a prior transmission device, e.g. in the case of said gear type multistage speed change device 61 (FIG. 10), the rotational speed of said driven shaft 64 cannot be changed steplessly because power is transmitted by a respective combination of gears having a different gear ratio. Since in order to obtain a plurality of rotational speeds from said driven shaft 64 a plurality of gears is required, the capacity and the weight of the device are, therefore, inadvantageously increased. Furthermore, since in a speed change operation it is required to interrupt a transmission of power and to obtain a correct matching between the crest of one gear and the root of the other gear, the speed change operation is intricate and the device itself must be complicated.

In the case of said belt type stepless speed change device 71, it is possible to change the rotational speed of said driven shaft 74. However, since in the case of the belt type stepless speed change device 71 a power is transmitted by a friction force generated in a contact surface between said belt 77 and both pulleys 75 and 76, the power transmission efficiency becomes lower, compared with said gear type multistage speed change device 61, due to a partial consumption of transmission power by said friction force. If a large torque is required from said driven shaft 74, a plurality of said belts 77 shall be provided, thereby a volume ratio of the device to the required torque is inadvantageously increased. A deterioration of the material used in the contact surface portion between said belt 77 and both pulleys 75, 76 is a problem and, in particular, when a load torque of the driven shaft 44 is large, a great degree of deterioration is expected so that it is difficult to use it for a device requiring a large torque at the driven shaft 74. Furthermore, since in the case of said friction disc type stepless speed change device 81 a power is also transmitted by a friction force, the power transmission efficiency is low in the same way as said belt type stepless speed changer device 71, so that it is difficult to use it for a device requiring a large torque at the driven shaft 84.

SUMMARY OF THE INVENTION

The present invention is based on such a prior problem and it is the purpose of the present invention to provide a transmission device having a simplified construction as well as a higher power transmission efficiency, and being capable of changing the rotational speed steplessly without interrupting a power transmission and also capable of reversing the rotation.

In order to solve the said objective, in the present invention, a transmission device comprising mainly a rotating shaft having a first inclined plane oblique to an axial direction and a rotating body engaged with said rotating shaft, wherein said rotating body is formed with a second inclined plane slidably engaging with said first inclined plane and wherein one of said rotating shafts and said rotating body is selected as a driving side and the other is selected as a driven side, and both or one of said rotating shafts and said rotating body are displaced in the axial direction of said rotating shaft.

Also, in the present invention, a transmission device is provided with a rotating shaft and a rotating body engaged with said rotating shaft, wherein one of said rotating shafts or said rotating body is provided with a first inclined plane oblique to the axial direction of said rotating shaft and the other said rotating shaft or said rotating body is provided with a piece which is formed with a second inclined plane slidably engaging with said first inclined plane and supported as being slidable only in the axial direction of said rotating body and wherein one of said rotating shafts and said rotating body is selected as a driving side and the other is selected as a driven side and said piece is displaced in said axial direction by an operating force.

At first, when in said construction said rotating shaft and said rotating body are, respectively, provided with said first inclined plane and said second inclined plane, the rotating shaft and the rotating body are rotated by a displacement of both or one of the rotating shafts and the rotating body by an operating force resulting from a mutually slidable engagement of said rotating shaft and said rotating body. The amount of relative displacement and rotation between the rotating shaft and the rotating body at the rotation is then controlled by an angle of inclination of the first and second inclined plane to the axial direction of the rotating shaft.

Secondly, when one of said rotating shafts or said rotating body is provided with said first inclined plane and said piece is provided with said second inclined plane, the rotating shaft and the rotating body are rotated, in the same way as before, by a displacement of the piece in said axial direction by an operating force due to a mutually slidable engagement of said first inclined plane and said second inclined plane. The amount of relative displacement and rotation between the rotating shaft and the rotating body at the rotation is, also, controlled by an angle of inclination of the first and second inclined plane mutually slidably engaged to said rotating shaft.

BRIEF DESCRIPTION OF THE DRAWINGS

FIGS. 5(a) and 6(b) are schematic representations showing a fourth example of the present invention.

DESCRIPTION OF THE PREFERRED EMBODIMENT

Figure 1A:
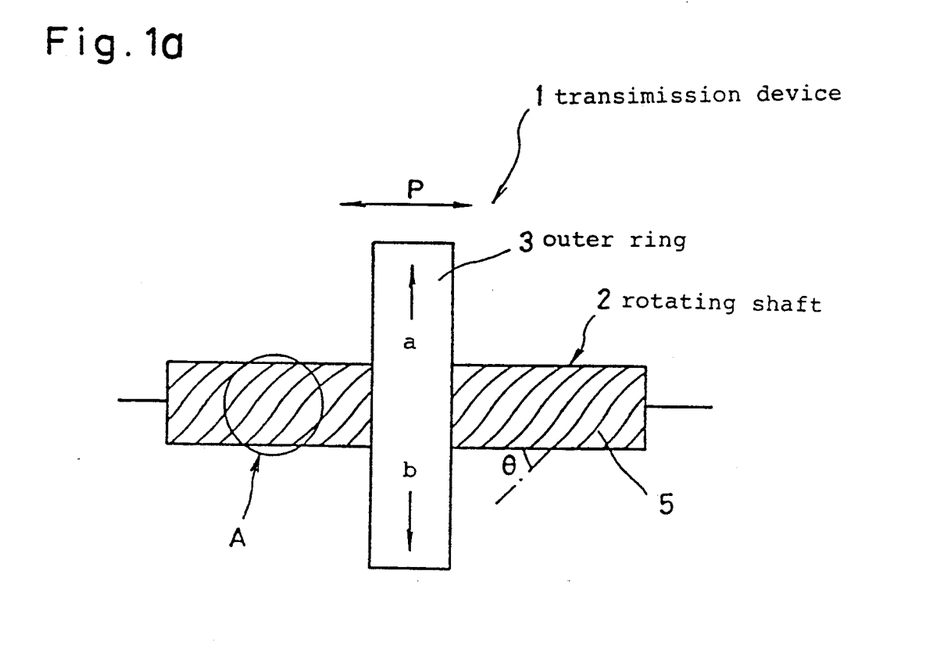
FIGS. 1(a) and 1(b) are schematic representations showing a first example of the present invention and FIG. 1(b) is an enlarged view of FIG. 1(a) in the direction of an arrow A.
Figure 1B:
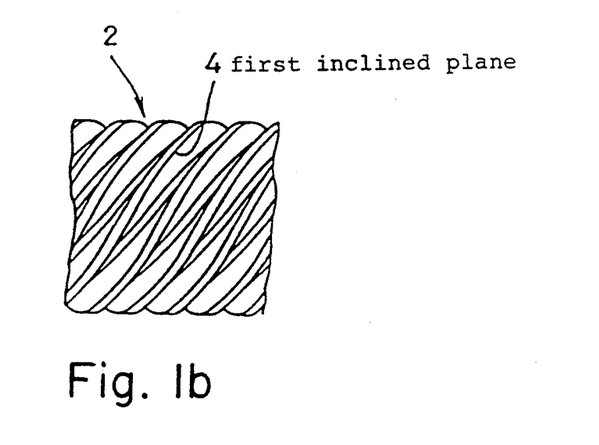

Embodiments of the present invention will be explained in the following according to the drawings. FIG. 1(a) is a transmission device 1 representing a first example of the present invention, wherein said transmission device 1 has a rotating shaft 2 and an outer ring 3, being a rotating body, externally engaged with said rotating shaft 2 and in the outer periphery of said rotating shaft 2, a thread-shape spline 5 (FIG. 1(b)) having a first inclined plane 4 oblique to the axial direction is formed. Said outer ring 3 has a hole (not shown) passing through both side surfaces facing each other and externally engaging with said rotating shaft 2, and in addition in the inner peripheral wall of said hole a thread-shape spline (not-shown) having a second inclined plane engaging wth said spline 5 of said rotating shaft 2 is formed.

Figure 2:
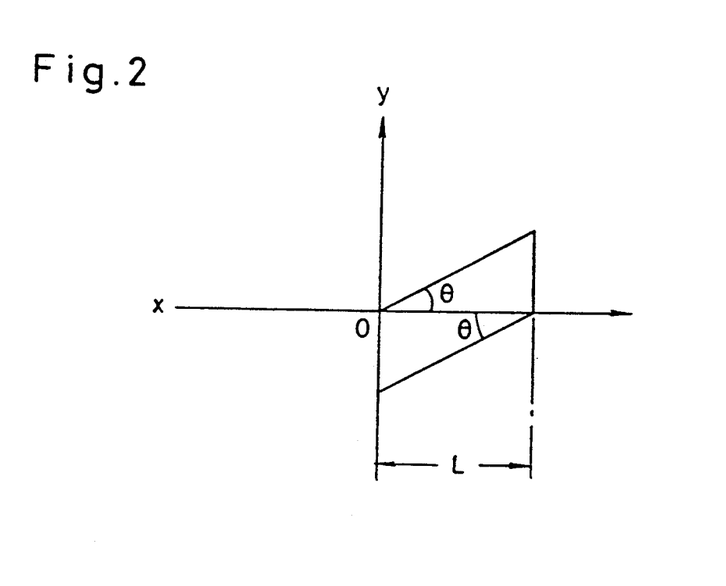
FIG. 2 is a descriptive diagram showing the amount of displacement and rotation of the rotating body to the rotating shaft un the first example.

When in the above construction said rotating shaft 2 is selected as a driving side and said outer ring 3 is selected as a driven side and the rotating shaft 2 is rotated in one direction, the outer ring 3 is rotated (in the direction of a or b) by a displacement of the outer ring 3 in the axial direction of the rotating shaft 2 by an operating force P due to a mutually slidable engagement of said first inclined plane 4 and said second inclined plane. Now, if the amount of displacement of the outer ring 3 in said axial direction is defined as L and an angle of inclination of said first inclined plane 4 and said second inclined plane, i.e., a helix angle of said spline 5 is defined as $\theta$, the outer ring 3 is rotated by a distance of $L \times \tan\theta$ relative to the rotating shaft 2 by neglecting an amount of rotation of the rotating shaft 2. That is, a relative displacement between said rotating shaft 2 and said outer ring 3 at the rotation of said rotating shaft 2 or said outer ring 3 is controlled by the helix angle $\theta$ of said spline 5. This amount of rotation is calculated as an amount of rotation on P.C.D. of said spline 5 such that a relation between said amount of displacement L and said helix angle $\theta$ is shown in FIG. 2. Now, in FIG. 2, X-axis shows a direction of displacement and an amount of displacement of the outer ring 3 and Y-axis shows a direction of rotation and an amount of rotation of the outer ring 3. Since the outer ring 3, on the other hand, is rotated by said rotating shaft 2 at the displacement of the outer ring 3, an amount of the relative displacement of the outer ring 3 to the rotating shaft 2 results in a sum or difference with an amount of rotation of the rotating shaft 2.

Thereby, when said outer ring 3 is displaced by L at a constant speed, the rotational speed of the outer ring 3 is, on the premise that the rotational direction of the rotating shaft 2 is minus and the direction contrary to the rotational direction of the rotating shaft 2 is plus, larger than the rotational speed of the rotating shaft 2 in the case of $A - L\tan\Theta > A$, is equal to that in the case of $A - L\tan\Theta = A$, is lower than that in the case of $A - L\tan\Theta < A$, is zero (stopped) in the case of $A - L\tan\Theta = 0$ and is reversed against that in the case of $A - L\tan\Theta < 0$, if an amount of rotation (angle of rotation $\times$ P.C.D. $\times \pi \div 360$) of the outer ring 3 rotated within that time of displacement by said rotating shaft 2 on the P.C.D. of the spline of the outer ring 3 itself is defined as A. Therefore, by a displacement of said outer ring 3 by said operating force P, it is capable of transmitting a constant speed unidirectional rotation of said rotating shaft 2, being a driving side, into the outer ring 3, being a driven side, as an increased speed rotation, an equal speed rotation, a decreased speed rotation, a stopped rotation or a reverse rotation. In addition, when the outer ring 3 is displaced in the axial direction of the rotating shaft 2 by an operating force P, the amount of displacement per unit time and the direction of rotation of the outer ring 3 can be changed steplessly.

Thereby, without enlarging the capacity of the device and with a simplified construction, a desired rotational speed can be obtained steplessly in the outer ring 3. Furthermore, by a fitting engagement between the rotating shaft 2 and the outer ring 3, a transmission efficiency at the transmission of power (rotation) from the rotating shaft 2 to the outer ring 3 is high and it is capable of connecting a driven shaft or an output requiring a large torque to the outer ring 3.

While in the above description the case of selecting said rotating shaft 2 as a driving side and said outer ring 3 as a driven side and displacing only the outer ring 3 in the axial direction of the rotating shaft 2 by said operating force P was described, it is also possible to obtain the same effect as the above in the case of selecting said outer ring 3 as a driving side and said rotating shaft 2 as a driven side and displacing the rotating shaft 2 or both of the rotating shaft 2 and the outer ring 3 in said axial direction by said operating force P. Now, in the case of displacing both of the rotating shaft 2 and the outer ring 3, said amount of displacement L of the outer ring 3 in the above description corresponds to a difference between the displacements of the rotating shaft 2 and the outer ring 3, if the direction of displacement of the rotating shaft 2 and the outer ring 3 is the same and corresponds to a sum of the displacements of the rotating shaft 2 and the outer ring 3 if the direction of displacement of the rotating shaft 2 and the outer ring 3 if the direction of displacement of the rotating shaft 2 and the outer ring 3 is opposite.

While in said transmission device 1 (shown in FIG. 1(a)) it is shown such as said outer ring 3, being a rotating body, engages with said rotating shaft 2 externally, an outer periphery of the rotating shaft 2 and an outer periphery of the outer ring 3 can be engaged, irrespectively, as shown later in FIG. 5. Now, in the following description, it is presumed that said rotating shaft 2 is selected as a driving side and said outer ring 3 is selected as a driven side and only the outer ring 3 is displaced in the axial direction of the rotating shaft 2 by an operating force.

Figure 3:
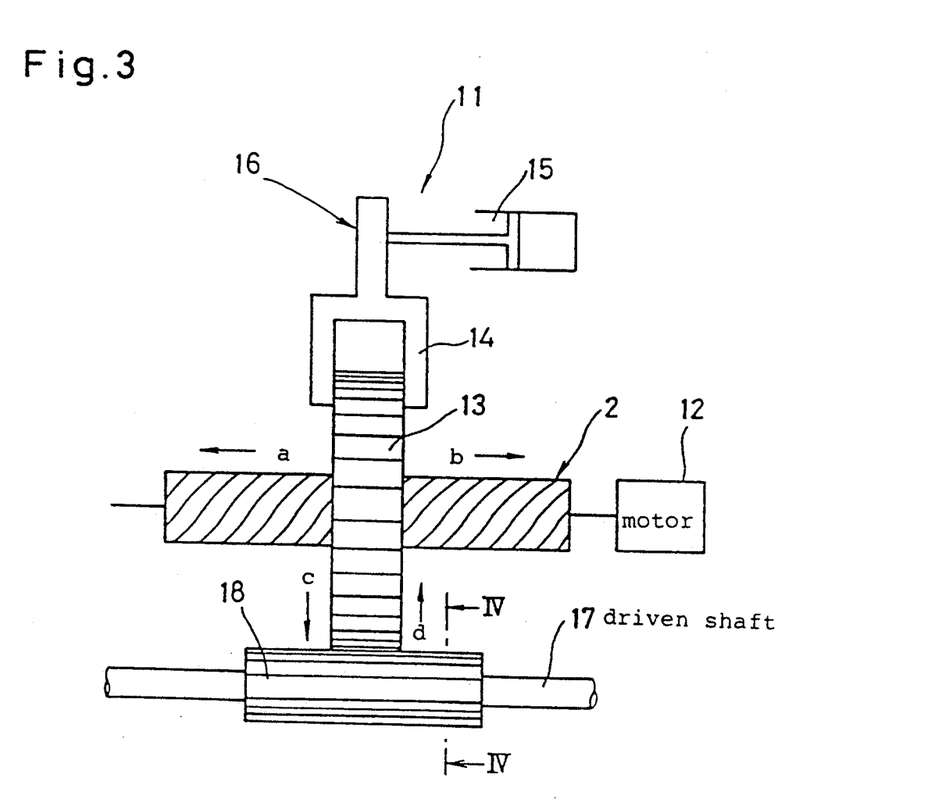
FIG. 3 is a schematic representation showing a second example of invention.
Figure 4:
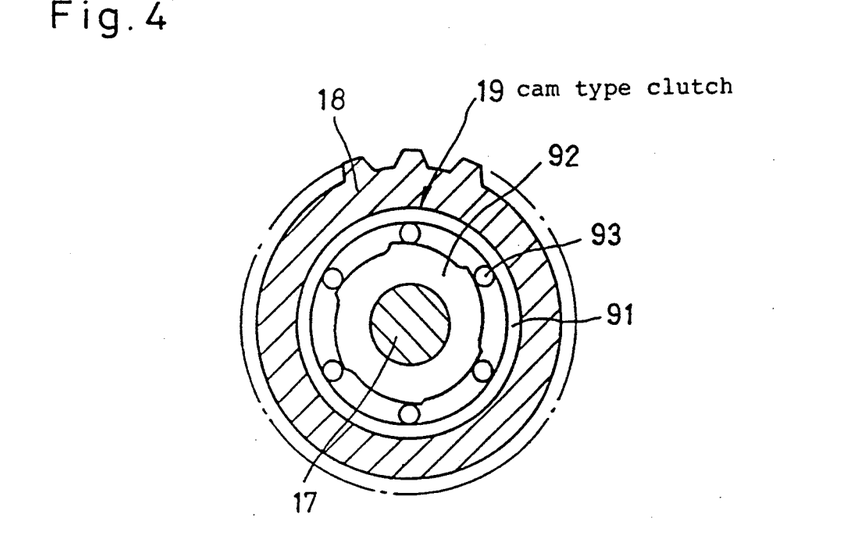
FIG. 4 is a schematic section view taken along the line IV—IV of 3, FIG. 5 a schematic representation showing a third example o present invention.

FIG. 3 shows a second example of the present invention. That is, a transmission device 11 has the same rotating shaft 2 as in the above-mentioned transmission device 1, a motor 12 connected to said rotating 2 and a gear 13 corresponding to said outer ring 3. Furthermore, the transmission device 11 is provided with an insertably holding piece 14 holding the gear 13 is rotatably at its outer periphery, a driving portion 16 comprising a piston 15 for displacing said insertably holding piece 14 in the axial direction of said rotating shaft 2 and supplying said operating force and a driven shaft 17 connected to the outer periphery of said gear 13. Said driven shaft 17 is connected to said gear 13 through a driven shaft gear 18 provided around the driven shaft 17. Between said driven shaft 17 and said driven shaft gear 18 is mounted a cam type clutch 19 which is a rotation orienting member allowing a unidirectional rotation of the driven shaft 17, as shown in FIG. 4. Now, the cam type clutch 19 has known construction comprising outer ring 91 fixed to said driven shaft gear 18, a disc 92 having a curved surface inclined to said outer ring 91 and fixed to said driven shaft 17 and balls 93 received between the outer ring 91 and the disc 92. Said rotation orienting member can be a pawl type back-stopper etc. as far as it allows unidirectional rotation of the driven shaft 17.

When in such a construction said rotating shaft 2 is rotating at a low speed or stopping, the gear 13 repeats a forward rotation (arrow c) and a reverse rotation (arrow d) by a reciprocal displacement of said gear 13 in the axial direction of the rotating shaft 2 (arrow a and b) by said driving portion 16, thereby said driven shaft gear 18 also repeats a forward rotation and a reverse rotation. Since said cam type clutch 19 is then mounted between the driven shaft gear 18 and said driven shaft 17, the driven shaft 17 is only rotated in either case of a forward rotation or a reverse rotation of said gear 13. Therefore, when said gear 13, being a rotating body, is displaced reciprocally, it is capable of transmitting a unidirectional continuous rotation of the rotating shaft 2, being a driving side, into the driven shaft 17 as a unidirectional intermittent rotation. Now, when a rotation orienting member is not provided between said gear 13 and said driven shaft 17, said driven shaft 17 rotates in two directions alternatively at a different speed. In FIG. 3 an example of said driving portion 16 for supplying an operating force displaces said gear 13 by a piston 15. Other constructions can also be used irrespectively.

Figure 5:
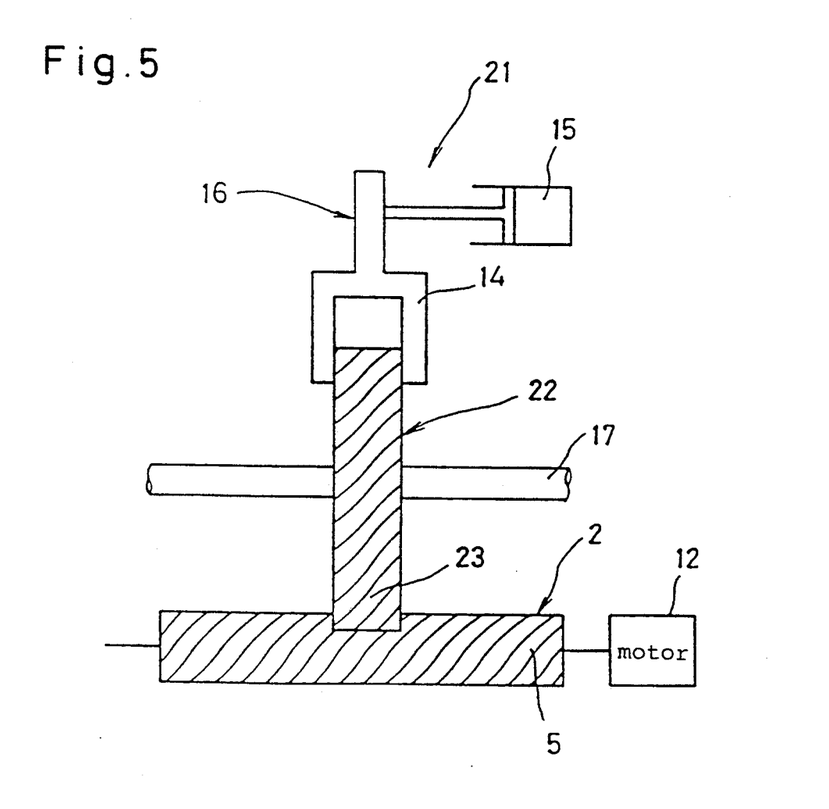

Furthermore, said gear 13 can be arranged as shown in FIG. 5 without being necessarily engaged with said rotating shaft 2 externally. That is FIG. 5 is a third example of the present invention, wherein at the outer periphery of the rotating shaft 2 of a transmission device 21 a gear 22 is connected to the rotating shaft 2 and at the outer periphery of said gear 22 a thread-shape spline 23 engaging with said thread shape spline 5 of said rotating shaft 2 is formed. A driven shaft 17 passes through said gear 22 at its center of rotation and the above-mentioned cam type clutch 19 is mounted between the driven shaft 17 and the gear 22. It is thereby capable of attaining the same action and effect as said transmission device 11.

Figure 6A:
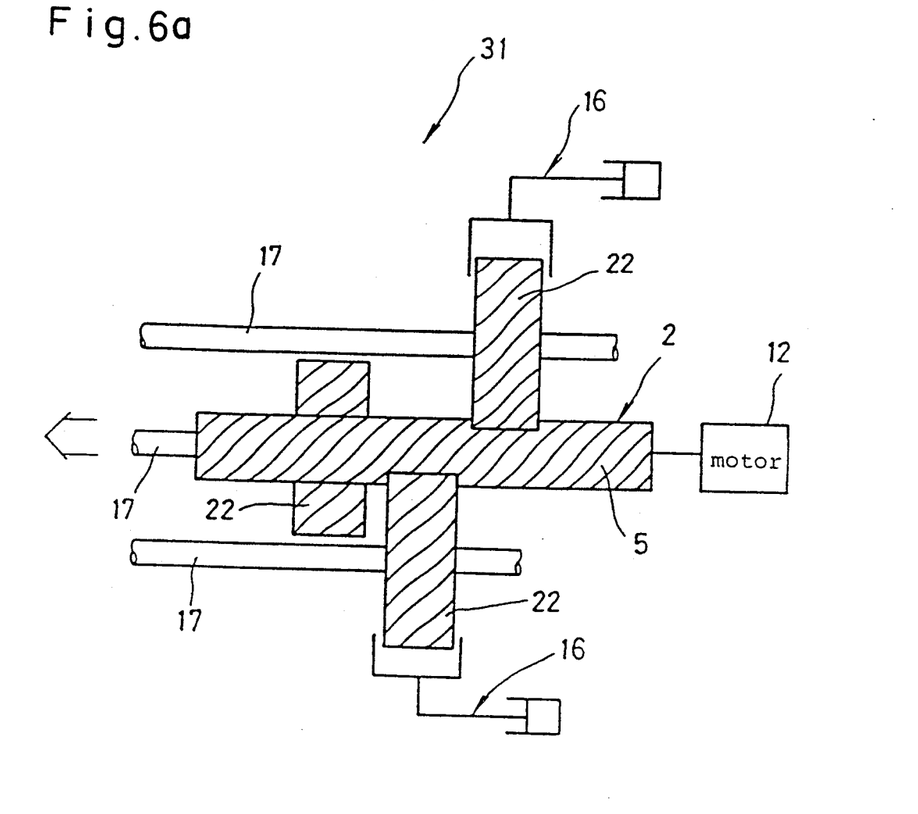
Figure 6B:
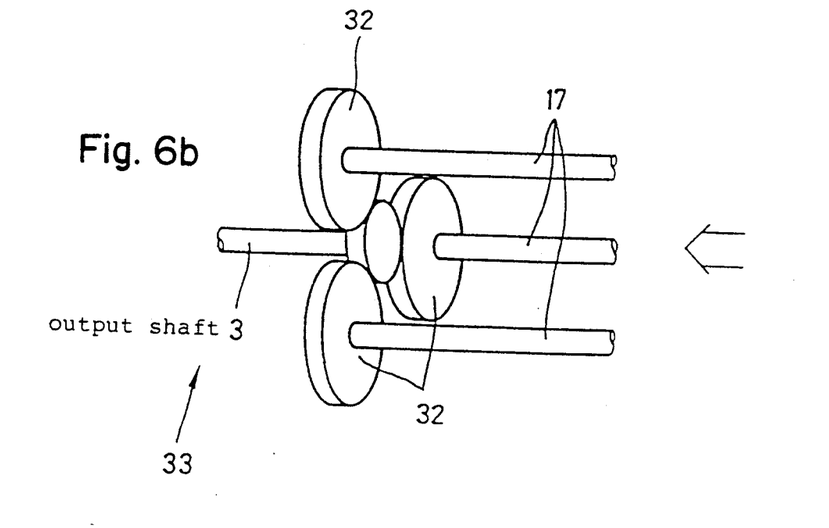

FIGS. 6(a) and 6(a) show a fourth example of the present invention, wherein a transmission device 31 is provided with three gears 22, as shown in FIG. 5. Each of said gear 22 is provided with said driving portion 16 (FIG. 6 (a)) and three driving portions 16 are preset so as to actuate in a uniform time difference to each other. In addition, the driven shafts 17 connected to said gears 22 through a cam type clutch 19 (FIG. 4) are connected to an output shaft 33 through gears 32 provided at the end of the driven shafts 17 (FIG. 6 (b)).

Figure 7:
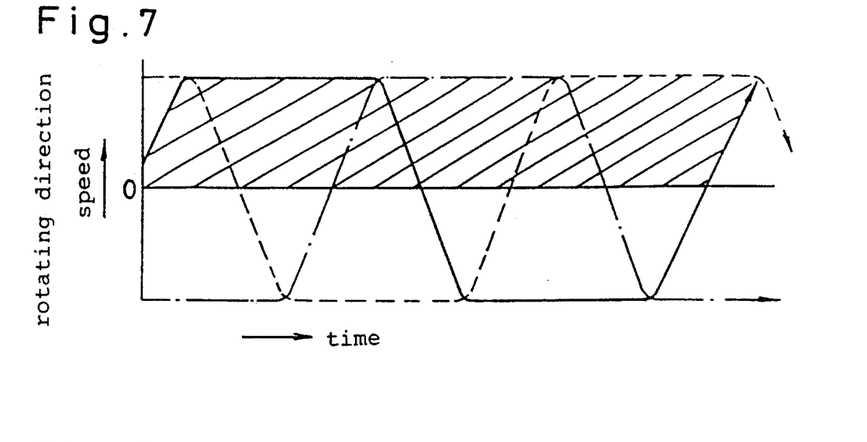
FIG. 7 is a relation diagram showing a relation between a speed of the driven shaft in the direction of rotation and time in the fourth example of the present invention.

When in such a construction, each of said driving portions 16 is actuated and said gears 22 are displaced in the axial direction of said rotating shaft 2 at a constant speed and in a uniform time difference, each of said gears 22 is rotated in a uniform phase difference to each other as shown in FIG. 7. Said driven shafts 17 are then connected to the gears 22 through said cam type clutch 19 (not-shown), respectively, thereby being rotated only following a unidirectional rotation of the gears 22 (shaded area of FIG. 7) according to the property of the cam type clutch 19. It results, therefore, in that the rotation of said output shaft 33 connected to each of the driven shafts 17 is in a unidirectional continuous rotation. It is possible, therefore, to transmit a unidirectional continuous rotation of the rotating shaft 2, being a driving side, into said output shaft 33 as a unidirectional continuous rotation increased or decreased at a predetermined speed change ratio. Although in this example a case that said gears 22 are displaced in a uniform time difference to each other, the time difference at a displacement of a plurality of gears is not necessarily uniform but can be non-uniform.

Figure 8:
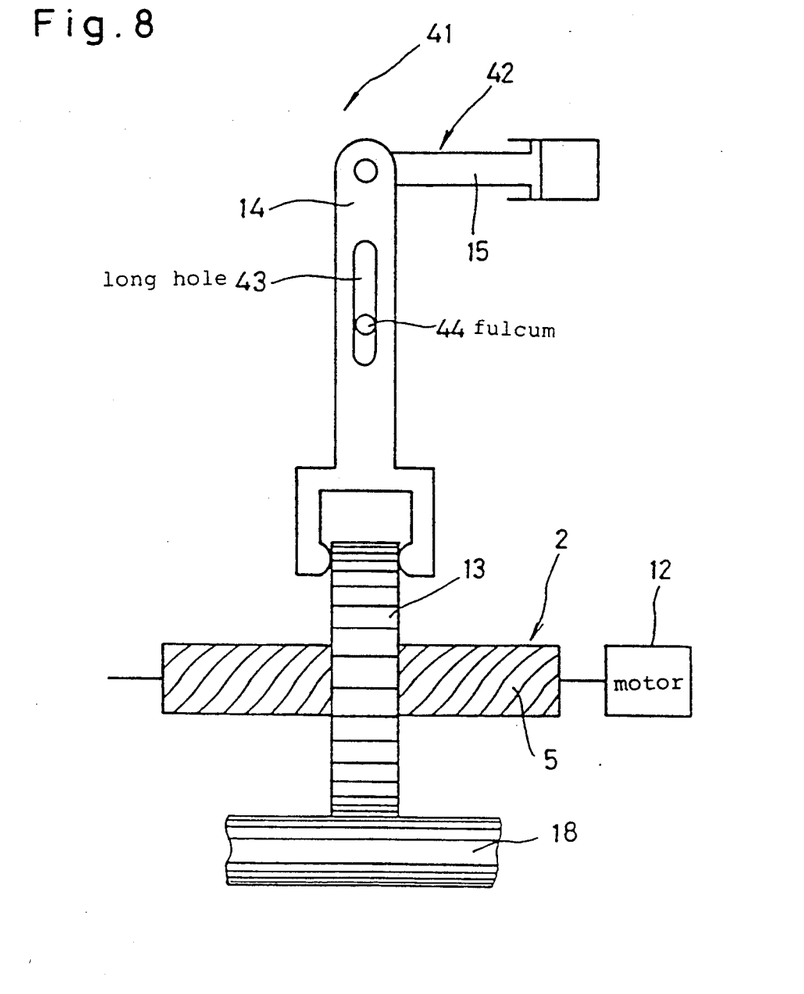
FIG. 8 is a schematic representation showing a fifth example of invention.

FIG. 8 shows a fifth example of the present invention, wherein a transmission device 41 has almost the same construction as said transmission device 11 as shown in FIG. 3 a driving portion 41 has a lengthwise insertably holding piece 14. Said insertably holding piece 14 holds said gear 13 slidably at one end and is pivotably connected to said piston 15 at the other end and between both its ends a long hole 43 is provided. Furthermore, a fulcum 44 is supported displacably in a direction perpendicular to the axial direction of said rotating shaft 2 by a portion of the transmission device 41 (not shown), wherein the fulcum 44 is engaged with the long hole 43 of said insertably holding piece 14 with a play, thereby a varialable mechanism for changing the amount of relative displacement per unit time between said rotating shaft 2 and said gear 13 in said axial direction being realized in the driving portion 42. When in such a construction an amount of relative displacement per unit time or a displacement speed of said gear 13 relative to said rotating shaft 2 is changed depending on a positional change of said fulcum 44, the rotational speed of the gear 13 can be changed as generally explained according to FIG. 1 and FIG. 2.

It is, therefore, possible to transmit a rotation of constant speed of the rotating shaft 2 into the gear 13 steplessly at a desired rotational speed by changing the displacement speed of the gear 13. If the same as said driving portion 42 is used for the above-mentioned transmission devices 21, 31, the same effect can also be obtained in each transmission device 21, 31. Although in this example the one in which a variable mechanism is used for said driving portion 16 as above-mentioned is shown, said displacement speed of said gear 13 can be changed, irrespectively, by other constructions.

Figure 9:
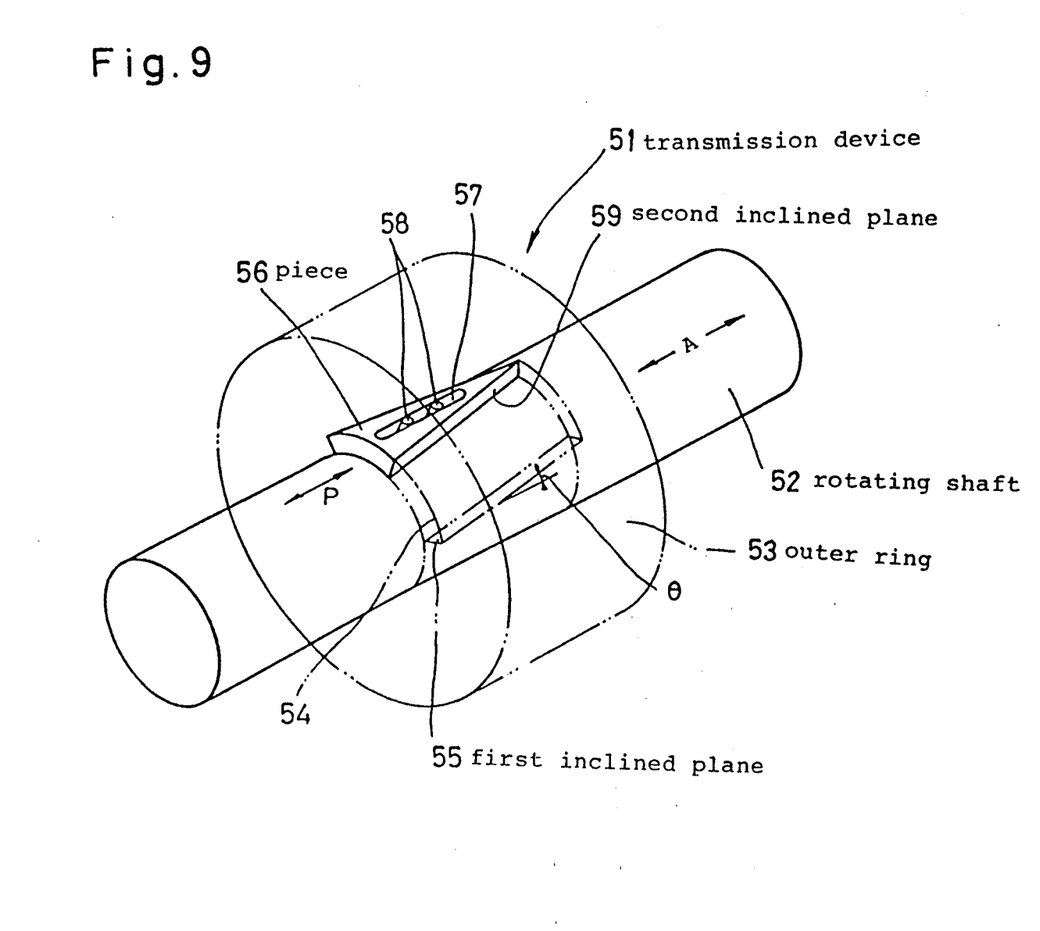
FIG. 9 is a partial perspective view showing a sixth example of the present invention.

FIG. 9 shows a seventh example of the present invention, wherein a transmission device 51 has a rotating shaft 52 and an outer ring 53 externally engaged with said rotating shaft 52. Said outer ring 53 is provided with a groove 54 at the portion for engagement with said rotating shaft 52 and both side walls of said groove 54 located in the direction of rotation of the rotating shaft 52 are formed with a first inclined plane 55 oblique to the axial direction of the rotating shaft 52. A piece 56, fitted within said groove 54 with a play, is supported by the outer peripheral surface of the rotating shaft 52. Said piece 56 has a long hole 57, into which pines 58, 58 projecting from the outer peripheral surface of the rotating shaft 52 are inserted with a play. Furthermore, said piece 56 is displacable in the axial direction of the rotating shaft 52 (arrow A of FIG. 9) and its movement in the direction of rotation of the rotating shaft 52 (arrow B of FIG. 3) is restricted by said pins 58, 58 and furthermore the piece 56 is formed with a second inclined plane 59 facing to the first inclined plane 55 of said groove 54 as well as slidable engaging with the first inclined plane 55 at the displacement of the piece 56.

When in said construction the piece 56 is displaced in the direction of pressurizing the contact pressure between said first inclined plane 55 and said second inclined plane 59 by applying said piece 56 an operating force P for displacing said piece 56 in the axial direction of said rotating shaft 52, the rotating shaft 52 and the outer ring 53 are rotated in a reverse direction to each other due to a slidable engagement between the first inclined plane 55 and the second inclined plane 59. The amount of relative displacement and rotation between the rotating shaft 52 and said outer ring 53 is then determined by an angle of inclination $\theta$ of the first inclined plane and the second inclined plane to the rotating shaft 52. Therefore, when one of said rotating shafts 52 and said outer ring 53 is selected as a driving side and the other is selected as a driven side and either of the rotating shaft 52 or the outer ring 53, being a driving side, is rotating, by a displacement of said piece 56 in the axial direction of the rotating shaft 52 by said operating force P unidirectional rotation of constant speed at said driving side is transmitted into said driven side as an increased speed rotation, an equal speed rotation, a decreased speed rotation, a stopped rotation or a reverse rotation. (Refer to the description of the first example in detail). Therefore, it is possible to obtain the same effect as the above-mentioned transmission device 1.

As described above, in the present invention, a transmission device is provided with a rotating shaft having a first inclined plane oblique to an axial direction and a rotating body engaged with said rotating shaft and formed with a second inclined plane slidably engaging with said first inclined plane, wherein one of said rotating shafts and said rotating body is selected as a driving side and the other is selected as a driven side and both or one of said rotating shaft and said rotating body are displaced in the axial direction of said rotating shaft.

Therefore, the rotating shaft and the rotating body are rotated by a displacement of both or one of the rotating shafts or the rotating body by an operating force due to a mutually slidable engagement of said first inclined plane and said second inclined plane, Furthermore, the amount of relative displacement and rotation between the rotating shaft and the rotating body at the rotation is then controlled by an angle of inclination of the first and second inclined plane to the axial direction of the rotating shaft.

Thereby, by changing a relative speed of displacement and a relative direction of displacement of the rotating shaft and the rotating body, it is possible to transmit a rotation of constant speed at said driving side into said driven side at a steplessly variable speed within a possible range or to transmit the rotation into the driven side in a reverse direction. Since said transmission can be performed only by displacing both or one of the rotating shaft and the rotating body, it is possible to make a transmission device in a simplified construction without increasing its capacity or weight. Since the rotating shaft and the rotating body are in a fitting engagement, the efficiency of transmission is high, thereby being usable even in the case requiring a large torque at he driven side.

A transmission device is also constructed such that one of said rotating shafts and said rotating body engaged with said rotating shaft is provided with said first inclined plane and a piece having a second inclined plane slidably engaging with said first inclined plane is provided in the other of the rotating shaft and the rotating body, wherein said piece is displacable only in the axial direction of the rotating shaft and is displaced in said axial direction by an operating force. Therefore, the rotating shaft and the rotating body are rotated by a displacement of the piece in said axial direction by an operating force due to a mutually slidable engagement of said first inclined plane and said second inclined plane. The amount of relative displacement and rotation between the rotating shaft and the rotating body at the rotation is, also, controlled by an angle of inclination of the first and second inclined plane to the axial direction of the rotating shaft. Therefore, in this case it is also possible to obtain the same effect as in the first example of the present invention.

What is claimed is:

1. A transmission device comprising a rotating shaft having a first inclined plane oblique to an axial direction, an rotating body engaged with said rotating shaft, wherein said rotating body is formed with a second inclined plane slidably engaging with said first inclined plane and wherein one of said rotating shaft and said rotating body is selected as a driving side and the other is selected as a driven side, a driven shaft with rotation controlled in a predetermined direction of rotation connected to said driven side, and an output shaft connected to said driven shaft wherein both or one of said rotating shaft and said rotating body are displaced in the axial direction of said rotating shaft temporally by an operating force.

2. A transmission device as in claim 1 wherein an operating means for producing said operating force includes means for variably controlling an amount of relative displacement per unit time in said axial direction between said rotating shaft and said rotating body.

3. A transmission device as in claim 2 wherein said rotating body is a ring having first and second side surfaces normal to said rotating shaft and inner and outer peripheral surfaces extending between said first and second side surfaces wherein said inner peripheral surface includes said second inclined plane in sliding engagement with said first inclined plane.

4. A transmission device as in claim 2 wherein said rotating body is a ring having first and second side surfaces normal to said rotating shaft an outer peripheral surface extending between said side surfaces wherein said outer peripheral surface includes said second inclined plane in sliding engagement with said first inclined plane.

5. A transmission device comprising:
a rotatable shaft having an external thread;
a rotatable body having a thread in sliding threaded engagement with said rotatable shaft;
means operatively associated with said rotatable shaft or said rotatable body for positioning and rotatable body at a predetermined axial location along said rotatable shaft;
means operatively associated with said positioning means for axially displacing said rotatable body relatively from said predetermined axial location along said rotatable shaft;
means operatively associated with said rotatable shaft or said rotatable body for rotatably driving said body or said shaft; and
an output shaft operatively associated with the one of said rotatable body or said rotatable shaft not operatively associated with said driving means.

6. A transmission device as in claim 5 wherein said displacing means includes means operatively associated therewith for variably controlling an amount of relative displacement per unit time in said axial direction between said rotatable shaft and said rotatable body.

7. A transmission device as in claim 6 wherein said rotating body is a ring having first and second side surfaces normal to said rotating shaft an inner and outer peripheral surfaces extending between said first and second side surfaces wherein said inner peripheral surface includes said second inclined plane in sliding engagement with said first inclined plane.

8. A transmission device as in claim 6 wherein said rotating body is a ring having first and second side surfaces normal to said rotating shaft an outer peripheral surface extending between said side surfaces wherein said outer peripheral surface includes said second inclined plane in sliding engagement with said first inclined plane.

9. A transmission device comprising:
a rotatable driving shaft having an axis and an inclined plane oblique to said axis;
a plurality of rotatable bodies engaging said driving shaft, each of said bodies having a second inclined plane in sliding threaded engagement with said first inclined plane;
a plurality of driven shafts operatively associated with said rotatable bodies;
an output shaft engaging said plurality of driven shafts; and
a plurality of driving portions engaging said rotatable bodies for supplying an operating force to said rotatable bodies thereby displacing said rotatable bodies in said axial direction and wherein said driving portions are associated so as to be actuated in a temporal sequence.

10. A transmission device as in claim 9 wherein said driving portions includes means operatively associated therewith for variably controlling an amount of relative displacement per unit time in said axial direction between said rotatable shaft and said rotatable body.

11. A transmission device as in claim 10 wherein said rotating body is a ring having first and second side surfaces normal to said rotating shaft an inner and outer peripheral surface extending between said side surfaces wherein said outer peripheral surface includes said second inclined plane in sliding engagement with said first inclined plane.

* * * * *